United States Patent [19]
Paulson

[11] 3,792,895
[45] Feb. 19, 1974

[54] BALANCED AND INTEGRATED CHASSIS AND FLOOR SYSTEM FOR MOBILE HOME AND MODULAR UNITS

[76] Inventor: Orville B. Paulson, 838 E. Sierra Madre, Glendora, Calif. 91740

[22] Filed: Sept. 28, 1972

[21] Appl. No.: 293,153

[52] U.S. Cl. .................................. 296/28 R, 52/220
[51] Int. Cl. .............................................. B62d 21/02
[58] Field of Search .. 296/28 R, 28 M, 31 P; 52/79, 52/220

[56] References Cited
UNITED STATES PATENTS

| | | | |
|---|---|---|---|
| 1,995,573 | 3/1935 | Matthews | 52/79 |
| 3,188,694 | 6/1965 | Hammar | 296/28 R |
| 3,529,389 | 9/1970 | Wilkins | 52/618 |
| 3,574,390 | 4/1971 | Metsker | 296/31 P |
| 3,643,389 | 2/1972 | Sheppley | 52/79 |

Primary Examiner—David Schonberg
Assistant Examiner—John A. Pekar
Attorney, Agent, or Firm—Williamson, Bains & Moore

[57] ABSTRACT

An integrated chassis and floor system for mobile homes and the like utilizes a pair of widely spaced, elongate flanged frame beams constituting the exterior sides of the chassis as well as a floor system integrated therewith. The heavier frame beams are transversely interconnected by a multiplicity of spacing and reinforcing sections having vertically disposed intermediate webs and upper and lower angular flanges, said lower flanges serving as supports for a lower horizontal floor partition "skin" medium. A stratum of strong plastic material such as urethane is laid up against and above said "skin" and extends into the longitudinal frame beams, integrating said transverse sections and sealing the lower floor section of said system with said longitudinal beams. Upper horizontal flooring sections (one or two layers of flooring) are supported upon and interconnected with the upper angle flanges of said transverse sections and serve to further integrate the entire flooring and chassis system. The said transverse sections have at least one set of substantially aligned, large apertures formed therethrough for intercommunicating plenums formed in said flooring system and for also, with freedom of sloping from the horizontal, accommodating conduits for drain and plumbing. Preferably media are provided by for example, smaller holes at the sides of said apertures to accommodate and fasten strap or hanger members for supporting such ducts. One or more sets of longitudinally extending sections, constructed of the same kind of material as the transverse reinforcing sections, are medially disposed within the floor system traversing said first reinforcing sections and having the multifunctions of further reinforcing the entire floor and chassis system and further dividing the transverse plenums between the upper and lower flooring sections to define intake and return ducts or the like for air conditioning and heating.

8 Claims, 7 Drawing Figures

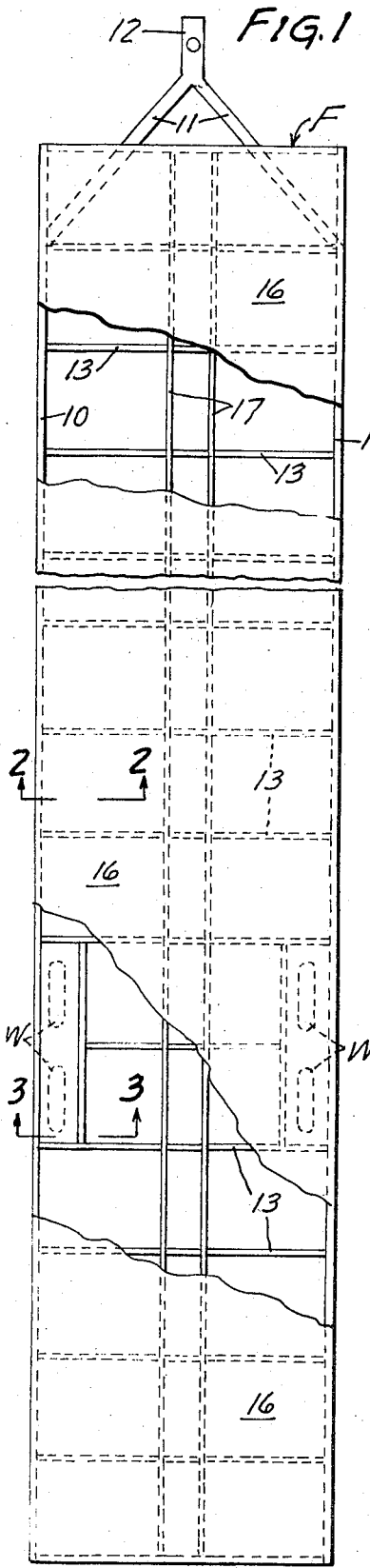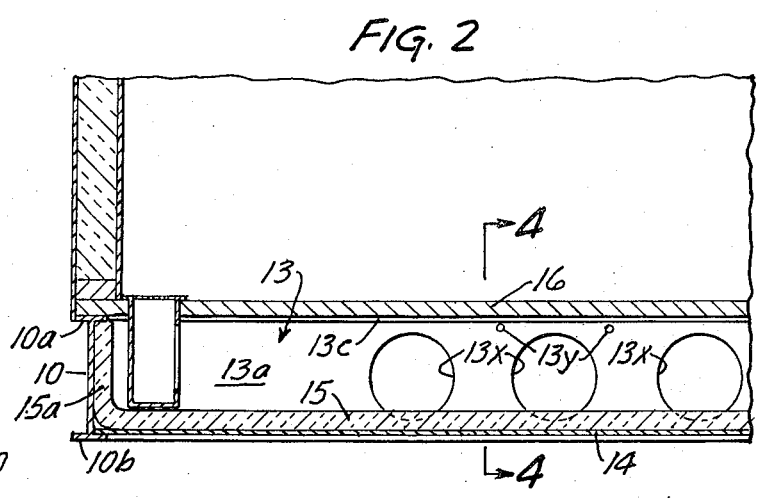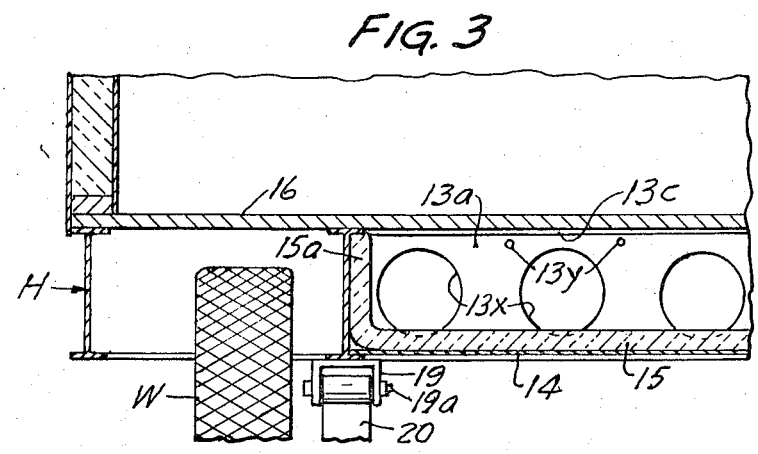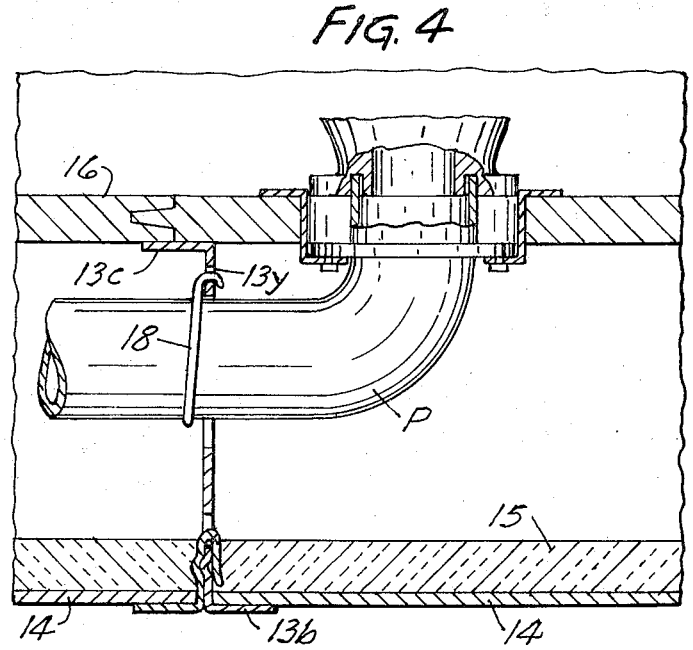

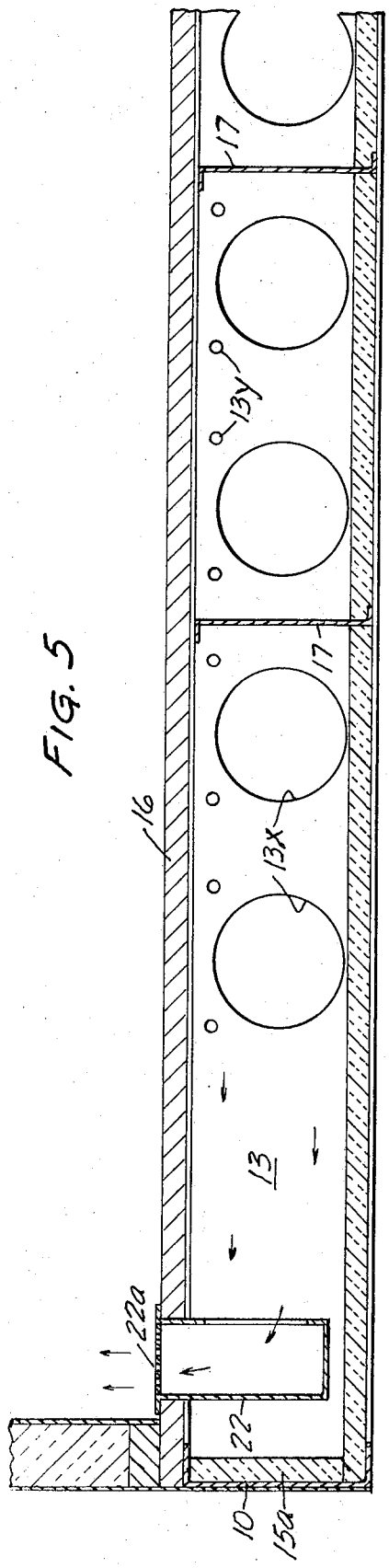
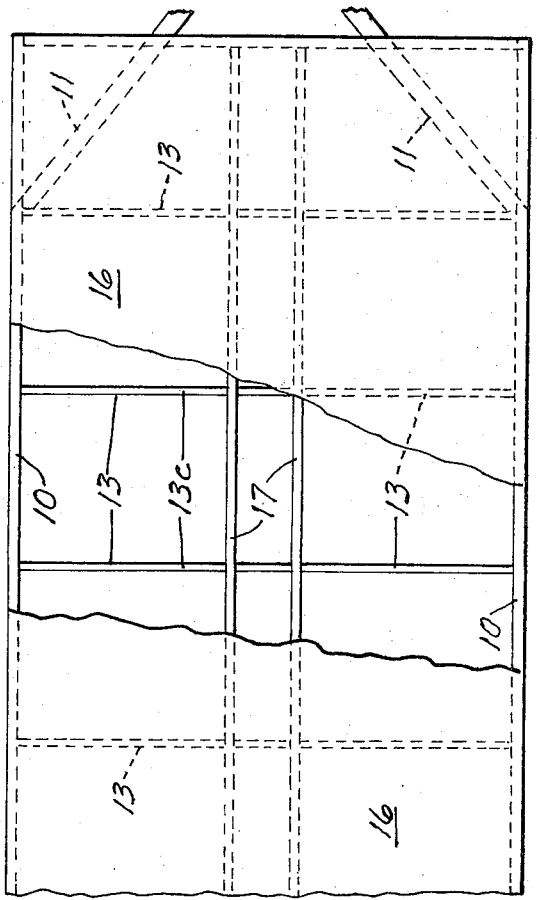
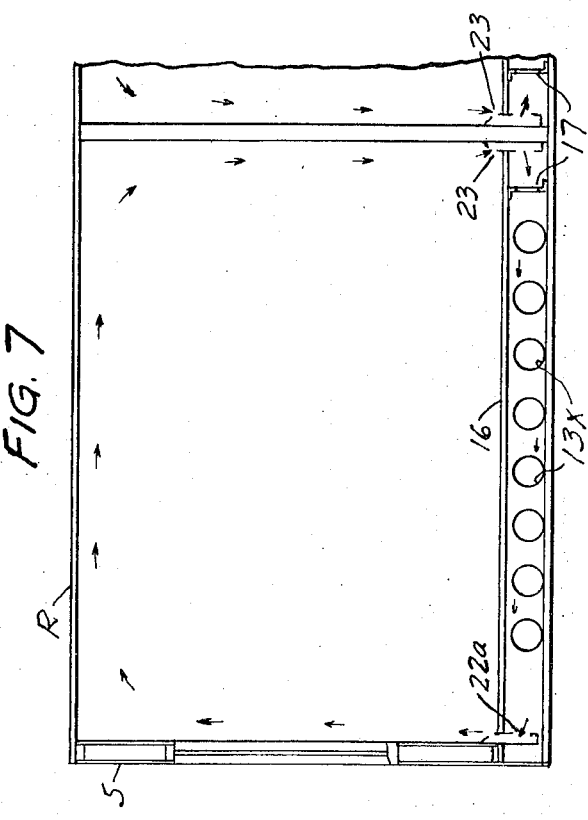

BALANCED AND INTEGRATED CHASSIS AND FLOOR SYSTEM FOR MOBILE HOME AND MODULAR UNITS

BACKGROUND OF INVENTION

The mobile home industry has achieved significant success in producing lower cost housing and in reducing taxes to home owners through the use and rental of property for temporarily or permanently positioning mobile homes. Modular housing and its principles are now being extensively applied and will, in the future, supersede to a substantial extent, conventional buildings for homes and housing units. Major improvements in the design, economy and process of manufacture or assembly of mobile homes and modular units, in my opinion, should materially benefit the housing industry as a whole.

The present day floor and chassis systems and construction for mobile homes and for modular units conventionally employ a multiplicity of wood or metal joists spaced about sixteen inches apart over a steel chassis frame to obtain adequate strength and rigidity of purpose of the system or unit. The main beams of the chassis or support are usually disposed inwardly of the longitudinal sides of the construction rather than at the peripheral or perimeter edges thereof and are not integrated to perform multiple functions with the flooring system.

To obtain proper spacing between the flooring sections proper and a lower sealed bottom floor partition, the said joists must be relatively wide so that adequate space for receiving air conditioning ducts, drain pipes and plumbing, may be provided. In the assembly or building of mobile homes, present day methods almost universally require the chassis of the mobile vehicle to be inverted and thereafter the laying-out of the joist floor is accomplished on the inverted unit, requiring subsequent fastening of the joist floor to the unit and then requiring inversion of the complete assembly back to normal position. The heavy, relatively wide joist members must be cut or designed and spaced to allow intercommunication between plenums formed beneath the top flooring partition and the overall width of the joists and thickness of upper and lower floor partitions cause the center of gravity in the finished flooring system to be relatively high above the ground or other supporting medium for the wheels.

UNDERLYING PRINCIPLES OF MY INVENTION

A fundamental principle of my invention and the main object thereof is to minimize the number of essential components for an integrated chassis frame and flooring system by causing all essential components to serve as many different functions as possible in such integrated construction. I employ longitudinal chassis beams disposed at the outside longitudinal perimeters of my floor system and serving in the dual function of constituting the perimeter frame for the floor as well as the main beams of the chassis system.

In close cooperating relation with said structure I employ a multiplicity of transverse spacing and reinforcing sections spanning said side beams and interconnecting the same, and having vertically disposed intermediate webs and upper and lower angular flanges. Conventional light gauge zee bars may be employed or other strips or sections having angled or T-flanges on the upper and lower edges thereof. These sections are disposed across the shortest section of the floor system interconnected at their ends with the chassis frame members and the lower flanges thereof support a "skin" or closure board upon which is laid up a heavy stratum of a strong plastic mat erial such as urethane which seals the entire bottom partition of the flooring system with the longitudinal beams of the chassis to greatly strengthen the entire construction.

The multiplicity of zee bars or other flanged sections have preferably two or more sets of aligned, large accommodation apertures for intercommunicating the plenums formed below the upper flooring, and further, for accommodating ducts and conduits for drains, plumbing, etc. The upper flooring material in one or two layers is supported upon and interconnected with the upper flanges of the transverse spacing and reinforcing sections or zee bars. One or more longitudinally extending flange sections are preferably employed to define multi-way ducts for flow of air.

I further prefer to provide in said transverse sections adjacent the large apertures means for readily securing hanger straps or the like for supporting ducts and conduits in a desired longitudinal sloping relation as required.

DETAILED DESCRIPTION OF A PREFERRED EMBODIMENT OF INVENTION

In the accompanying drawings, wherein like reference characters refer to similar parts throughout the several views:

FIG. 1 is a top plan view with vertical walls and top removed, of the floor system of my invention, some portions being broken away to show underlying parts;

FIG. 2 is a cross section taken on the line 2—2 of FIG. 1 looking in the direction of the arrows;

FIG. 3 is a cross section taken on the line 3—3 of FIG. 1 showing the reinforced portion of one of the framing structures of the system surrounding the trailer wheels and connection of the chassis and floor system with the springs of the chassis;

FIG. 4 is a vertical section taken on the line 4—4 of FIG. 2 and wherein is mounted the forward end of a plumbing drain pipe connected with a toilet bowl;

FIG. 5 is a cross section taken on the line 5—5 of FIG. 1 showing a longitudinally disposed divider and reinforcing strip for defining plenums and intercommunication for withdrawl of air in the air conditioning system;

FIG. 6 is a fragmentary top plan view of the forward portion of the floor system on a much larger scale than that of FIG. 1, having portions broken away to show interior construction; and FIG. 7 is a vertical section taken through approximately one half of a completed mobile home showing by arrows circulation of warmed or cooled air with intake and return registers and ducts formed and divided by a longitudinal zee-bar or webbed section.

As shown in the drawings, an integrated floor and chassis system for mobile homes and the like is illustrated having as the main frame for the chassis and serving the secondary important function of constituting the perimeter frame for the floor unit, an assembly indicated as an entirety by the letter F. Assembly F comprises two heavy longitudinal channel or I-beam members 10 having upper and lower angular flange lips 10a and 10b, respectively. said members being spaced apart the total width of the mobile home and chassis. As shown, a pair of heavy draft beams 11 are connected at their rearward ends to the forward ends of frame members 10 and converge and are interconnected at their forward ends with a draft tongue 12 by which the mobile home or trailer may be pulled by connection with a motor vehicle.

My integrated and reinforced floor system spans and is interconnected with the longitudinal frame members 10, and inherently comprises a multiplicity of relatively light metal transverse sections 13, which may be in the form of light gauge zee bars, sheet metal channels, or the equivalent, having central vertical webs 13a, lower angled horizontal flanges 13b, and upper angled horizontal flanges 13c. These transverse sections span and interconnect the two longitudinal heavy frame channels 10 and are interconnected with the flanges thereof by suitable means such as welding, drive screws or the like.

The lower flanges 13b of said transverse sections support and are attached to thin partitions or supporting skins 14 which may constitute pre-cut sections of sheet metal or hard sheet plastic materials. The skins preferably extend across all of the transverse sections 13 for the full area of the lower partition of the floor assembly and are preferably supported at their peripheral edges upon the lower flanges 13b and the lower flanges 10b of the frame.

Upon the skin 14, which is spaced below the entire upper flooring stratum of my system, I form by lay-up or otherwise a relatively thick stratum of hard plastic material 15, such as foamed urethane, which has tensile strength and heat-insulating qualities and which preferably, as shown in FIGS. 2 and 3, in its formation is extended upwardly (pan-like) to provide side portions 15a which are disposed and at least partially fill the inwardly disposed channels defined by the longitudinal main frame members 10. By this method a very durable and impervious shell and bottom floor partition is produced which embeds the lower flanges 13b and upstanding central webs 13a of the interconnecting sections 13.

The upper floor stratum constitutes one or more layers of flooring material 16 which is supported upon and covers the upper flanges 13c of the multiplicity of transverse reinforcing sections 13, and the section if made of a multiplicity of pieces, have the longitudinal edges of the pieces tongued and grooved or otherwise sealed to form an integrated sealed upper floor partition 16.

It will be seen that between the upper and lower horizontal partitions of the floor assembly the vertical webs of the reinforcing transverse sections 13 divide the interior into a multiplicity of separate plenums. These plenums are intercommunicated by a plurality of sets of communication apertures 13x formed through the vertical webs 13a of the sections with the corresponding sets in the several sections being axially aligned longitudinally of the floor structure. The sections 13 constituting the forward and rear ends of the floor system are of course imperforate to form sealed ends for the floor system.

As shown in FIG. 5 and indicated by heavy broken lines in FIG. 1, one or more longitudinal sections 17 of light gauge material similar in cross sectional shape to that of the transverse sections 13, extend medially and longitudinally of the double spaced floor structure and are secured and integrated with bottom stratum 15 and the upper flooring layer 16 similarly to the cross sections 13. These sections with sealed interconnection at their upper and lower flanges define longitudinal air and space dividers within the double partition floor systems, which dividers may either be apertured near their forward and/or rear ends, or at other desirable locations to interconnect with a plenum or plenums on the lateral sides thereof. Thus a duct system is provided for air conditioning, heating or the like due to the dual functions of the transverse reinforcing and divider sections 13 and the longitudinal divider sections 17.

Referring again to the apertures 13x formed in the transversely disposed divider sections 13, I prefer to form the communication apertures as large as possible consistent with the needed strength of the central webs 13a so that in addition to the communication between transverse plenums formed in my floor system space is provided for accommodating ducts or pipes which extend longitudinally within the hollow floor system. Since the apertures 13x are of substantial diameter drain and plumbing pipes P may slope from the forward portion of the frame and floor system rearwardly and may be successively supported on hanger straps or rods 18. In this connection I prefer to provide hanger-retaining elements inherently provided by portions of the sections 13 adjacent the apertures 13x, such as the small apertures 13y which will accommodate hanger straps and rods, and enable the same to be secured in supporting relation by bending or enlarging the ends thereof which are passed through the apertures 13y.

As shown in FIGS. 3, 5 & 7 rectangularly shaped heavy chassis frame portions designated as entireties by the letter H, are provided in widely spaced, outwardly disposed relation to accommodate the two sets of supporting wheels W for the mobile chassis, and to further strengthen the chassis, including the connection of the floor system and oblong frames H with the axle housings and springs of the chassis. The heavy oblong frames H may be constructed of I-beams or H-beams welded together in rectangular formation and interconnected at forward and rearward ends by welding or the like to the heavy longitudinal frame beams 10 previously described.

As shown in FIG. 3 depending, heavy bolsters 19 are welded or if desired, pivotally secured to the lower heavy webs of the I-beams constituting the rectangular frame structure H for surrounding the wheels W. Springs 20, broken away in part (FIG. 3) are pivotally connected at their upper converging ends to clevis bolt or shackle 19a and in conventional manner not shown, are connected with an axle or axle housing extending transversely of the system and to which the wheels are rotatably connected.

FIGS. 5, 6 and 7 illustrate the provision with use of the longitudinally extending webs and sections 17 of longitudinal air ducts for return of air for heating or air conditioning. The arrows indicate flow direction and in the forced draft of air from a heater, furnace or the like, the heated or air conditioned air passes forwardly through the numerous plenums formed by the webbed cross spanning sections 13 with the intercommunicating large circular passages 13x.

In FIG. 7 one half of a large mobile home is illustrated in vertical section, having the outer side walls S insulated by joists 21 as shown, and having thereon a roof section R. Registers 22 as shown in FIG. 5, having open work grills 22a communicate at spaced intervals longitudinally of the floor system with the interior of the housing. The interior longitudinal wall W as shown in FIG. 7 is of double ply structure to provide insulation and adjacent or at the lower edge thereof, return entrances 23 are provided with suitable grills 23a.

From the foregoing description it will be seen that I have provided a very strong, integrated floor and chassis system forming with the longitudinal light gauge zee-bars or equivalent web sections, traversing the multiplicity of cross sections 13 a multi-cellular covered and sealed at top and bottom by the upper flooring horizontal partition 16 and the lower hard plastic horizontal partition 15.

It will further be seen that the integrated cellular construction makes provision for a plurality of transverse plenums therein, interconnected with several sets of aligned communication apertures for intake flow of heating or cooling air; and further provides at the medial portions of the floor system dividing longitudinal sections 17 to define return passages or ducts. The integrated cellular structure is reinforced and spans the heavy longitudinal I-beams or perimeter frame members which have the dual function of constituting the longitudinal chassis frame.

The space between top flooring sections and the lower flooring plan may be substantially reduced in height, as contrasted with conventional flooring systems which employ wooden 2×4 rafters or the like, and the entire floor system may be built and set up upon the axles and main chassis structure of the frame without requiring the inversion of a separate chassis frame as is now utilized conventionally and generally in mobile homes.

It will further be seen, from the foregoing description in connection with the accompanying drawings, that I have conceived a new method for production of an integrated and balanced floor system with heavy support for chassis use or foundation of a modular housing unit. This method consists essentially in forming a multicellular body having a pair of relatively heavy metal beams disposed as perimeter longitudinal floor frames and also as the main frame members of a modular unit or chassis. In such method of cellular construction I utilize a plurality of relatively light gauge flanged transverse sections (such as zee bars) spanning said heavy metal beams and said cellular body. I also employ a plurality of similarly webbed and flanged longitudinal sections crossing said first mentioned transverse section and in addition to reinforcing, also dividing the cellular structure longitudinally of the overall body. My method further includes the pre-forming in said transverse flange sections of a plurality of sets of communicating apertures. The method is further characterized by forming a bottom sealed closure for the cellular structure through the medium of a layer of hard (preferably foamed) plastic material, such as urethane, in which the lower flanges of the transverse sections and also the longitudinal thin sections are embedded; and lastly, forming an upper covering for the cellular structure by a stratum of flooring material secured upon the upper flanges of the transverse and longitudinal flanged sections.

What is claimed is:

1. An integrated and balanced chassis and floor system for mobile homes and the like having in combination,
    a pair of relatively heavy, elongate flanged frame beams constituting the main beams of the chassis and also the perimeter frame of the floor system,
    a multiplicity of comparatively light spacing and reinforcing sections transversely interconnecting said beams and having vertically disposed intermediate webs and upper and lower angular flanges,
    a bottom floor partition sealing and integrally connecting said reinforcing transverse sections with said longitudinal frame beams and comprising a stratum of strong plastic material in which the lower flanges of said transverse sections are embedded,
    an upper floor partition covering and connecting the upper flanges of said transverse reinforcing sections and also interconnected at the longitudinal edges thereof with said pair of heavy frame beams, and
    said transverse sections having at least one set of substantially aligned, relatively large apertures formed therein for intercommunicating transverse plenums formed within said flooring system, and for also accommodating conduits disposed longitudinally of said system.

2. The structure and combination set forth in claim 1 further characterized by at least one longitudinal flanged section generally similar in construction to said transverse sections and transversing said transverse sections and sealed at upper and lower flanged portions with said lower plastic stratum and with said flooring upper section, and disposed in the medial longitudinal portion of said system to further reinforce the structure, and in addition to divide the interior into longitudinal lanes.

3. The structure set forth in claim 2 wherein a plurality of said longitudinal flanged sections are employed traversing said transverse sections and disposed in the medial longitudinal portion of said system, defining with the cooperation of sets of aligned communication apertures in the medial webs of the transverse reinforcing sections a lane or duct for return of temperature-conditioning air.

4. The structure and combination set forth in claim 1 further characterized by means in the intermediate webs of said transverse reinforcing sections, adjacent the upper portion of said apertures for retaining hanger elements for supporting and positioning conduits which extend longitudinally of said system and through certain of said apertures.

5. The structure and combination set forth in claim 1 and a pair of rigid rectangular frames constructed of metal beams disposed in transverse alignment in the rear and side portions of the assembly for encompassing running gear including wheels of the chassis and for connection with the running gear of the chassis,
    said rectangular frames constituting also a part of the integrated floor system and further reinforcing the same.

6. The structure and combination set forth in claim 1 and thin sheet partition media supported by the lower flanges of said transversely disposed reinforcing sections,
    and said stratum of plastic material being laid up upon said sheets and foamed thereon.

7. The structure and combination set forth in claim 6 wherein said plastic stratum continues along its longitudinal edges upwardly against the inner medial webs of said heavy flanged frame beams.

8. An integrated and balanced chassis and floor system for mobile homes and the like having in combination,
- a pair of relatively heavy, elongate flanged frame beams constituting the main beams of the chassis and also the perimeter frame of the floor system,
- a multiplicity of comparatively light, spacing and reinforcing sections transversely interconnecting said beams and having vertically disposed continuous intermediate webs and upper and lower angular flanges,
- a continuous bottom floor partition integrally connecting and reinforcing said transverse sections with said longitudinal frame beams and forming therewith a series of transversely disposed plenums or chambers,
- a continuous upper floor partition covering and connecting the upper flanges of said transverse reinforcing sections and also interconnected at the longitudinal edges thereof with said pair of heavy frame beams, and
- said transverse sections having at least one set of substantially aligned, relatively large apertures formed therein for intercommunicating transverse plenums formed within said flooring system, and for also accommodating conduits disposed longitudinally of said system.

* * * * *